United States Patent [19]

Nakagawa et al.

[11] Patent Number: 4,634,531
[45] Date of Patent: Jan. 6, 1987

[54] MEMBRANE TREATMENT METHOD FOR SEMIPERMEABLE MEMBRANES

[75] Inventors: Yukio Nakagawa, Kyoto; Katsufumi Oto; Masaru Kurihara, both of Otsu, all of Japan

[73] Assignee: Toray Industries, Inc., Tokyo, Japan

[21] Appl. No.: 700,331

[22] Filed: Feb. 12, 1985

Related U.S. Application Data

[63] Continuation of Ser. No. 563,796, Dec. 21, 1983, abandoned.

[30] Foreign Application Priority Data

Dec. 24, 1982 [JP] Japan .................................. 57-226382

[51] Int. Cl.$^4$ ............................................. B01D 13/00
[52] U.S. Cl. ..................................... 210/639; 210/654
[58] Field of Search ........................ 210/639, 500.2, 654

[56] References Cited

U.S. PATENT DOCUMENTS

| | | | |
|---|---|---|---|
| 3,373,056 | 3/1968 | Martin | 210/639 X |
| 3,877,978 | 4/1975 | Kremen et al. | 210/639 |
| 3,926,798 | 12/1975 | Cadotte | 210/500.2 X |
| 4,039,440 | 8/1977 | Cadotte | 210/500.2 X |
| 4,226,673 | 10/1980 | Fremont | 210/500.2 X |

OTHER PUBLICATIONS

Cadotte, et al., Post Treatment Process for Reverse Osmosis Membranes, Jan. 1981, pp. 1–35, available from NTIS, Springfield, Va. 22161.

Sourirajan, Ed., Reverse Osmosis and Ultrafiltration, 1985, pp. 1–19, published by ACS.

*Primary Examiner*—Frank Spear
*Attorney, Agent, or Firm*—Wegner & Bretschneider

[57] ABSTRACT

The present invention relates to the membrane treatment method for semipermeable membranes, that is, a method wherein it is characterized that not only remarkable improving effect of selective separation performance of semipermeable membranes is obtained but also durability of said improving effect for selective separation performance is improved by means of extremely simple and easy procedures such as said semipermeable membranes are successively brought into contact with very dilute of aqueous solutions including effective substances which are individually water-soluble in due order and for a short time, where said effective water-soluble substances form water-insoluble or very little water-soluble materials thereof fixed on the surface of said semipermeable membranes.

The aforesaid remarkable effect is observed especially in the case of semipermeable membranes consisted of cross-linked polymers based of furfuryl alcohol including furfuryl alcohol as an essential monomer component, and polyamides, when, at the same time, the due combination of water-soluble amines and water-soluble aldehyde is employed as said aqueous solutions including effective water-soluble substances.

21 Claims, No Drawings

MEMBRANE TREATMENT METHOD FOR SEMIPERMEABLE MEMBRANES

This application is a continuation of U.S. application Ser. No. 563,796, filed Dec. 21, 1983, now abandoned.

BACKGROUND OF THE INVENTION

1. Field of Invention

The present invention relates to a method of treating a semipermeable membrane, which leads to an improvement in the selective separation performance of the membrane. Also the durability of the membrane, as measured by its effective operating life, is extended.

2. Description of the Prior Art

Up to the present, there have been various kinds of semipermeable membranes proposed as selectively separable membranes employing reverse osmosis process and such semipermeable membranes have been widely applied such as to the desalination process of sea water and brackish water, or to the recovery process of valuable materials.

As for above described semipermeable membranes, there are various kinds of semipermeable membranes, one of which, for instance, is an asymmetric membrane, that is to say, so-called "Loeb type" membrane represented by cellulose acetate membranes and another type which is a composite membrane formed of a microporous substrate and an ultrathin film formed thereon as a barrier layer having semipermeability, being made of polymers which are different from those which constitute said substrate, such as polyamides, polyureas and cross-linked polymers based on furfuryl alcohol and so on.

Semipermeable composite membranes have such characteristics or merits over so-called "Loeb type" membranes as follows;

(1) Optimum combinations of substrate and ultrathin film or barrier layer can be designed and selected according to purpose and object for applications.

(2) There is no necessity for semipermeable membranes to be preserved or stored in water or in wet condition but preservation in dry condition can be adopted.

(3) In general, they are more durable to hydrolysis by acid or alkali or deterioration by microorganisms as observed especially in cellulose acetate membrane.

As the well-known semipermeable composite membranes, for instance, there are ones which are formed of a microporous substrate made of polysulfone, polyvinyl chloride or cellulose acetate and a thin film formed thereon, as a barrier layer, composed of cross-linked polymers based on furfuryl alcohol (U.S. Pat. No. 3,926,798) and ones prepared by a barrier layer composed of cross-linked polymers of polyethyleneimine (Laid-open Japanese Patent Application Publication No. 127,481/1977 (Tokkai-sho No. 52-127481)) and so forth Inventors of the present invention as well had already proposed a semipermeable barrier layer of which is composed of cross-linked polymers obtained by the polycondensation with furfuryl alcohol and such polyfunctional alcohols as inositol or sorbitol, tris-(2-hydroxyethyl) isocyanurate, tris glicidyl isocyanurate in the presence of sulfuric acid or the like as catalyst, and it was found that said semipermeable composite membrane held the characteristics and merits of aforesaid composite membranes, and besides exhibited extremely selective separation performance not only for sea water or brackish water but also for a lot of water-soluble organic compounds and inorganic compounds (Laid-open Japanese Patent Application Publication No. 24,602/1982 (Tokkai-sho No. 57-24602)).

These semipermeable membranes have structures such that a thin skin layer or barrier layer which substantially determines the reverse osmosis performance is supported by a layer called microporous layer or substrate, respectively, wherein the thickness of the skin layer or barrier layer is said to be about $0.1 \mu m$ and it is generally considered that the thinner the thickness is, the more preferable it is for the semipermeable membrane because water permeability becomes higher, wherein however, its quality is apt to be unstable. For example, in order that reverse osmosis is to be used in actual industries, semipermeable membranes are to be formed into membrane modules, and further as they are practically operated under such higher pressure as scores of $kg/cm^2$, selective separation performance of the semipermeable membranes is generally decreased not only by the physical factors such as pinholes on the surface of the semipermeable membranes, few mechanical failures and embossing of the semipermeable membranes but also by such chemical factors as hydrolysis observed in the case of cellulose acetate membranes.

There have also been proposed attempts to maintain or improve the desalination performance from another point of view. Mainly for cellulose acetate membranes as the object, there are plenty of reports, wherein, for example, a procedure to dose surface active agents into the feed-water in Japanese Patent Application Publication No. 28,650/1973 (Tokko-sho No. 48-28650), in Japanese Patent Application Publication No. 32,869/1977 (Tokko-sho 52-32869) a method to improve the selective separation performance of the deteriorated membranes with polyvinyl alcohol, and further, in Japanese Patent Application Publication No. 13,431/1978 (Tokko-sho No. 53-13431) a method of improving the selective separation performance with co-polymers of vinyl acetate and unsaturated carboxylic acid are also proposed, respectively. Inventors of the present invention had also proposed membrane treatment agents mainly composed of vinyl polymers having saponified ester groups modified by carboxylic acid (Laid-open Japanese Patent Application Publication No. 114,306/1980 (Tokkai-sho No. 55-114306)).

About mainly synthetic semipermeable membranes as object, for instance, improving methods for selective separation performances with polyvinylmethyl ether and with tannic acid are proposed in U.S. Pat. Nos. 3,373,056 and 3,853,755, respectively. Furthermore, in PB report No. 82-157,975 a method for improving selective separation performance by repairing the failed parts of semipermeable membranes with various kinds of synthesized colloids is studied.

Inventors of the present invention also proposed an improving method for selective separation performance of such semipermeable membranes as consisted of cross-linked polymers involving furfuryl alcohol as an essential monomer component with water-soluble amines (Laid-open Japanese Patent Application Publication No. 11,005/1983 (Tokkai-sho No. 58-11005)) before, and the present invention has been worked out as the result of further endeavors.

SUMMARY OF THE INVENTION

A primary object of the present invention is to improve the selective separation performance and durability of a semipermeable membrane. That object can be achieved by the following method:

A method for improving the selective permeability of a new or used semipermeable membrane which comprises sequentially contacting the membrane with a first aqueous solution and a second aqueous solution, said solutions containing mutually reactive water soluble compounds.

DESCRIPTION OF THE PREFERRED EMBODIMENTS

Characteristics of the present invention include remarkable improvement for selective separation performance of said semipermeable membranes and the improving of its durability by making the effective substances fixed on the surface of said semipermeable membranes by means of extremely simple and easy ways, that is, said semipermeable membranes are brought into contact with at least two kinds of very dilute aqueous solutions including compounds which are individually water-soluble but make water-insoluble or very slightly water-soluble materials when contacted with each other, in due order and only for a short time.

Optimum combinations of said water-soluble compounds are usually selected from the viewpoints of the reactivity between said water-soluble compounds and the kinds of semipermeable membranes.

In case of semipermeable membranes formed of cross-linked polymers including furfuryl alcohol as essential monomer component, semipermeable polyamide membranes and/or semipermeable polyurea membranes, for example, combinations of water-soluble amines and water-soluble aldehydes in this order or sequence lead to preferable results. More concretely, by the procedure that after said semipermeable membranes are treated with aqueous solutions including polyfunctional amines, e.g. polymers such as polymers as polyethyleneimine or monomers such as triethylenetetramine, aforesaid semipermeable membranes are treated successively with aqueous solutions involving such polyfunctional water-soluble aldehydes as glutaldehyde or glyoxal which form water-insoluble or very water-soluble materials with aforesaid amines, both selective separation performance and durability thereof rise remarkably.

Here, as said semipermeable membranes consisted of cross-linked polymers based on furfuryl alcohol as an essential monomer component, there are, for example, those consisted of barrier layers which are obtained from the thermopolymerization of furfuryl alcohol and/or mixtures of furfuryl alcohol and inositol, sorbitol, tris(2-hydroxyethyl) isocyanurate or the like in the presence of sulfuric acid, phosphoric acid or toluenesulfonic acid, more preferably with sulfuric acid as acid catalyst. More concretely, aforesaid semipermeable membranes are those proposed in U.S. Pat. No. 3,926,798 and Laid-open Japanese Patent Application Publication Nos. 107,882/1979 (Tokkai-sho No. 54-107882), 159,807/1980 (Tokkai-sho No. 55-159807) etc., which were proposed by inventors in the present invention.

And besides, as examples for said semipermeable membranes consisted of polyamides and/or polyureas, there are those constructed of barrier, layers or skin layers consisted of linear aromatic polyamides, cross-linked polyetheramides and cross-linked polyetherureas. As more concrete examples for semipermeable membranes consisted of cross-linked polyetheramide, for instance, there are those proposed in Laid-open Japanese Patent Application Publication Nos. 40,403/1981 (Tokkai-sho No. 56-40403), 24,304/1983 (Tokkai-sho No. 58-24303) and so forth, which were also proposed by inventors in the present invention.

These aforesaid semipermeable membranes are usually composite membranes which are made of microporous substrate consisted of polysulfone, polyvinyl chloride, polyvinylidene chloride, cellulose nitrate, especially more preferably made of polysulfone, and thin film formed thereon, as barrier layer, composed of aforesaid polymers.

Combination and orders or sequences of water-soluble compounds which mutually react at once whenever they are brought into contact are very important to improve especially durability of said improving effect for selective separation performance of said semipermeable membranes.

For above described semipermeable composite membranes made of cross-linked polymers based on furfuryl alcohol including furfuryl alcohol as an essential monomer component, polyamides and/or polyureas, combinations and due sequence of addition of water-soluble amines and water-soluble aldehydes, as effective substances, for example, lead to preferable results, wherein it is considered that water-soluble amines would contribute to improving the selective separation performance of said semipermeable membranes and water-soluble aldehydes would contribute to improving the durability of aforesaid improving effect. Here, it should be noted that above described combinations and orders of water-soluble compounds for said semipermeable membranes are not always to be restricted to water-soluble amines and water-soluble aldehydes but any effective combination of any kind of effective compound can be applied to any kind of semipermeable membrane according to the theory or idea described above. It may be needless to say that effective combinations of compounds or effective substances are different from those selected for above described such semipermeable membranes as consisted of aforesaid cross-linked polymers based on furfuryl alcohol, polyamides and/or polyureas in another kind of semipermeable membranes and optimum combinations of effective compounds are to be selected from experiments in accordance with foregoing theory or idea.

As said water-soluble compounds including polyfunctional amino groups, for example, ordinary alkyl amines, aromatic amines, acyclic or heterocyclic amines and oligomers or polymers thereof or the like are to be used as far as aforesaid compounds are water-soluble at least above 1 to 10 ppm or so. For foregoing alkyl amines, for instance, there are ethylenediamine trimethylenediamine, hexamethylenediamine, aminoguanidine and so forth. Phenylenediamines, triaminobenzenes, phenylhydrazine, aminodiphenylamines, diaminodiphenylmethanes and so forth are representatives of said aromatic amines. For said acyclic or heterocyclic amines, diaminocyclohexanes, aminomethylpiperidine and aminopiperadine, for example, are well known. As examples of said oligomers or polymers including polyfunctional amino groups, there are triethylenetetramine, tetraethylenepentamine, polyethyleneimine polyepiaminohydrin, polyepihalohydrin modified by ethylenediamine ("EPIAMINE") and so on.

From the viewpoint for durability of aforesaid improving effect for selective separation performance of said semipermeable membranes, oligomers or polymers composing polyfunctional amino groups such as tetraethylenepentamine, polyethyleneimine polyepiaminohydrin, polyepihalohydrin modified by aminomethylpiperidine give more preferable result.

As said water-soluble compounds including polyfunctional aldehyde groups in the present invention as well, for example, glyoxal, malonaldehyde, succinaldehyde, glutaldehyde, adipicdialdehyde, phtaldehydes are to be used.

Above described improving effects for selective separation performance and its durability by the combinations of said water-soluble compounds also are observed for unused fresh membranes right after manufacture as well as for membranes which were deteriorated in selective separation performance after operation of long duration.

Although aforesaid membrane treatments for said semipermeable membranes by due combinations of water-soluble compounds give sufficiently enough improving effect for selective separation performance even without any pretreatment, more preferable improvement effects for selective separation performance and its durability can be accomplished by adopting such pretreatment as cleaning the surface of said semipermeable membranes, especially in the case of deteriorated membranes after a long term duration of operation.

Generally well known procedures are to be adopted as such foregoing pretreatment (membrane cleaning). When fouling is considered to be caused by microorganisms, for instance, cleaning procedures with surface active agents or enzyme detergents or the like give good results. In case of fouling due to very slightly water-soluble metallic salts or inorganic colloids, ammonium citrate or bis-sodium salt of ethylenediamine tetraacetic acid or the like can be used effectively.

Said improvement effects for selective separation performance by the present invention are not always exhibited only once but can be displayed again and again at any time when said effects are diminished or exhausted.

And besides, it is needless to say that said effects of the present invention are displayed not only in the case of flat membranes but also for membrane elements or modules which are to be the practically employed forms for the industrial applications. And any shape of the membrane elements or modules such as tubler type, spirally wound type or hollow fiber type is to be employed, that is to say, there is no particular problem about the shape of the membrane elements or modules.

In the method of the present invention, concentrations of said water-soluble compounds in their aqueous solutions are well employed in the range of 1 ppm to 1% and more preferably, concentrations between 10 ppm and 1000 ppm are to be adopted. Secondly, although deionized water is more preferably employed for the solvent of said water-soluble compounds, said water-soluble compounds may be directly dosed into the objective supplied feed-water to be treated. Thirdly, operating pressure can be applied under the range of 1 to 100 kg/cm$^2$ and in usual cases, pressure range of 3 to 70 kg/cm$^2$ is preferably adopted. And lastly, though aforesaid improving effects for selective separation performance and durability thereof are observed immediately after the contact with said aqueous solutions involving said water-soluble compounds, a range of 10 minutes to 10 hours is usually to be adopted as the contact period with said aqueous solutions of water-soluble compounds.

Although there are a little difference among the degrees of above described improving effects for selective separation performance and its durability of said semipermeable membranes by treating with said water-soluble compounds in accordance with the kinds of combinations of said water-soluble compounds, having membrane cleaning or not before said membrane treatment, the kinds of said semipermeable membranes to be treated or the like, in case of the semipermeable membranes consisted of cross-linked polymers based on furfuryl alcohol as an essential monomer component, polyamides and/or polyureas, for instance, orderly combinations of above described water-soluble amines and water-soluble aldehydes exhibit such tremendous effects as that solutes permeabilities are improved by two thirds to one third or so in the selective separation performance and their durabilities last thousands of hours.

The reason why the effectiveness of the present invention is brought about has not yet been theoretically clarified in definite terms. Still, the effectiveness of the present invention is extremely great and the industrial significance is tremendously great from the viewpoints not only of the improvement of permeated water quality or concentration efficiency but also of the contribution to economic merits derived from aforesaid effectiveness itself.

Further merits of the present invention will become clear from the following examples.

EXAMPLE 1

Using a semipermeable composite membrane composed of sulfonated polyfurfuryl alcohols made in accordance with U.S. Pat. No. 3,926,798, a test was carried out with 3.5 wt % of aqueous sodium chloride solution at the operation conditions of 56 kg/cm$^2$, 25° C., pH 6.5, 50 cm/sec. of membrane surface velocities of supplied feed-water, results of which at 20 hours' operation were that sodium chloride rejection was 99.4% and permeated water flux was 0.29 m$^3$/m$^2$ day. The same successive test for reverse osmosis performance with this same membrane was continuously carried out at the same operation conditions as described above and after 2000 hours' operation, sodium chloride rejection was declined to 98.6 % and permeated water flux was also increased to 0.33 m$^3$/m$^2$ day.

After aforesaid same membrane was treated with supplied feed-water dosed 100 ppm of tetraethylenepentamine for one hour, it was washed with distilled water for two hours.

And further, after it was treated with the afresh adjusted supplied feed-water dosed 100 ppm of glutaldehyde for two hours, reverse osmosis performance was measured again with 3.5 wt % of aqueous sodium chloride solution and the results were that sodium chloride rejection was improved to 99.2%, while permeated water flux became 0.28 m$^3$/m$^2$ day.

This same membrane was successively operated continuously again at the same operation conditions as described above, and even after 200 hours' operation, sodium chloride rejection remained 99.1 %, while permeated water flux was 0.29 m$^3$/m$^2$ day.

By another experiment, the immediate appearance of water-insoluble or very slightly water-soluble materials was confirmed as soon as tetraethylenepentamine and glutaldehyde, both of which were individually water-soluble, were mutually mixed at 25° C.

COMPARATIVE EXAMPLE 1

Another same membrane was tested at the same operation conditions as Example 1 except that membrane treatment procedure with the supplied feed-water dosed glutaldehyde was omitted. Then, at 200 hours' operation after the membrane treatment with only tetraethylenepentamine, sodium chloride rejection was declined to 98.6%.

COMPARATIVE EXAMPLE 2

Another same membrane was tested at the same operation conditions as Example 1 except that the order for membrane treatment procedures with tetraethylenepentamine and glutaldehyde was reversed, that is, membrane treatment with tetraethylenepentamine was carried out after that with glutaldehyde. Then, though sodium chloride rejection was improved to 99.1% when both membrane treatments were carried out in above described order or sequence, at 200 hours' operation after aforesaid membrane treatments, sodium chloride rejection had already been declined to 98.6% again.

COMPARATIVE EXAMPLE 3

Condensation products of resorsinol and glyoxal was made in accordance with PB report No. 82-157,975. Another same membrane was tested just as in Example 1 except that it is treated with supplied feed-water dosed with 1000 ppm of above described resorsinol-glyoxal condensates instead of the successive treatments with supplied feed-water dosed tetraethylenepentamine and glutaldehyde in due order, then there appeared no improvement in sodium chloride rejection.

EXAMPLE 2

By using a spirally wound membrane element (7.0 m$^2$ of membrane area), dimensions of which are 10 cm of diameter and 1 m of length, manufactured with the semipermeable composite membrane composed of cross-linked furfuryl alcohols produced according to Example 1 of Laid-open Japanese Patent Application Publication No. 24,602/1982 (Tokkai-sho No. 57-24602), sea water desalination test by reverse osmosis was carried out. The sea water desalination test was carried out with pretreated sea water of 3.5 wt % salinity and below 4 of Fouling Index (F.I.), and the operation conditions were 56 kg/cm$^2$, 25° C., pH 6.5, 10 l/minutes of supplied feed-water flow rate and 13 % of water recovery, wherein 10 ppm of sodium bisulfite was dosed into the supplied feed-water in order to remove chlorine which was dosed at the pretreatment process as sterilizer.

Though initial desalination performance of aforesaid element at above described operation conditions, was 99.7% of salt rejection and 0.34 m$^3$/m$^2$ day of permeated water flux, salt rejection was declined to 98.8% after the operation of 5000 hours and the product water quality can not sufficiently satisfy the standard values (500 ppm) for drinking water settled by WHO (World Health Organization) any more.

With this same element, after 30 ppm of polyethyleneimine ("P-1000" manufactured by Japan Catalytic Chemical Industry (Nippon Shokubai Kagaku Kogyo) Co., Ltd.) was dosed into the supplied feed-water and treated for one hour, and further, after 30 ppm of glyoxal was dosed into the supplied feed-water and treated for one hour just as with polyethyleneimine, sea water desalination test was successively continued again at the same conditions as before the application of the foregoing membrane treatments except that only dosing amount of sodium bisulfite is varied to 80 ppm from 10 ppm. Salt rejection was improved to 99.6%, while permeated water flux was 0.27 m$^3$/m$^2$ day. And even after successive 3000 hours' operation, salt rejection of above described element maintained 99.5% and the product water quality still satisfied the WHO standard value.

By another experiment, the immediate occurrence of water-insoluble or very slightly water-soluble materials was confirmed as soon as polyethyleneimine and glyoxal, both of which were individually water-soluble, were mutually mixed at 25° C. At the same time, it was confirmed that no unreacted glyoxal was remained by means of gas chromatography and there appeared new absorptions derived from the reacted product by infrared spectra.

COMPARATIVE EXAMPLE 4

Another same membrane element was tested at the same operation conditions as Example 2 except that the membrane treatment procedure with glyoxal was omitted. In this case, when 1000 hours was passed after the membrane treatment with polyethyleneimine was carried out, salt rejection had already been below 98.9% and the WHO standard value had not been satisfied any more.

EXAMPLE 3

When two kinds of semipermeable composite membranes, that is those consisted of polyamide and cross-linked polyfurfuryl alcohol, both of which were made according to the Example 1 in Laid-open Japanese Patent Application Publication No. 40,403/1981 (Tokkai-sho No. 56-40403) as the polyamide membrane and the Example 2 in Laid-open Japanese Patent Application Publication No. 24,602/1982 (Tokkai-sho No. 57-24602) as the cross-linked polyfurfuryl alcohol, respectively were operated with the same pretreated sea water of 3.5 wt % salinity as in Example 2 in the present invention at the operation conditions of 56 kg/cm$^2$, 25° C. pH 6.5 and 50 cm/sec. of membrane surface velocities of supplied feed-water, salt rejection of aforesaid both membranes were 99.5% and 99.6%, respectively, while permeated water flux were 0.36 m$^3$/m$^2$ day and 0.38 m$^3$/m$^2$ day, respectively.

The above described membranes were at first treated with supplied feed-water dosed 100 ppm of polyethyleneimine for 30 minutes and secondly these same membranes were successively treated with supplied feed-water dosed 100 ppm of glutaldehyde for 10 minutes at the same operation conditions as described above except that adopted operation pressure was changed to 60 kg/cm$^2$. When reverse osmosis performance of aforesaid both membranes were measured with ordinarily supplied feed-water under usual operating pressure of 56 kg/cm$^2$ after both kinds of membrane treatments were carried out, salt rejection of both membranes were improved to 99.7% and 99.8%, respectively, while permeated water flux were 0.33 m$^3$/m$^2$ day and 0.32 m$^3$/m$^2$ day, respectively. Reverse osmosis performance of both membranes had hardly any change after successive 200 hours' operation.

EXAMPLE 4 and 5

Two kinds of semipermeable composite membranes, that is, those consisted of cross-linked polyfurfuryl alcohol and polyamide, the former of which ("MEMBRANE A") was the same membrane as manufactured in Example 2 in the present invention and the latter of which ("MEMBRANE B") was made in accordance with Example 1 in Laid-open Japanese Patent Application Publication No. 24,304/1983 (Tokkai-sho No. 58-24304) were alternatively operated with 3.5 wt % of aqueous sodium chloride solution and 2.0 wt % of aqueous ethanol solution at the operation conditions of 56 kg/cm$^2$, 25° C., pH 6.5 and 50 cm/sec. of membrane surface velocities of supplied feed-water.

Both foregoing membranes were at first treated with 1000 ppm of aqueous polyethyleneimine solution for two hours and reverse osmosis performance tests for aqueous sodium chloride solution and aqueous ethanol solution were conducted. After secondly these same membranes were treated with 100 ppm of aqueous glutaldehyde solution for one hour, usual reverse osmosis tests were carried out.

These test results were given in Table 1.

TABLE 1

| | Example 4 with MEMBRANE A | | Example 5 with MEMBRANE B | |
|---|---|---|---|---|
| Reverse Osmosis performance | for NaCl aq. Rej.-Flux (%)-(m$^3$/m$^2$ day) | for Ethanol aq. Rej.-Flux (%)-(m$^3$/m$^2$ day) | for NaCl aq. Rej.-Flux (%)-(m$^3$/m$^2$ day) | for Ethanol aq. Rej.-Flux (%)-(m$^3$m$^2$ day) |
| Before Membrane Treatment | 99.7-0.40 | 92-0.47 | 99.4-0.41 | 85-0.44 |
| After Membrane Treatment with polyethyleneimine | 99.9-0.35 | 96-0.37 | 99.6-0.31 | 90-0.31 |
| After Membrane Treatment with glutaladehyde | 99.9-0.36 | 96-0.38 | 99.7-0.30 | 90-0.31 |

EXAMPLES 6 and 7

After the same two kinds of semipermeable membranes as used in Example 4 and 5, in the present invention, respectively ("MEMBRANE A" and "MEMBRANE B") were operated with 3.5 wt % aqueous sodium chloride solution, these same membranes were operated with 2 wt % of aqueous ethanol solution just as same as in Example 4 and 5 as well, while in this case, aforesaid both membranes were treated with supplied aqueous ethanol solution including 1000 ppm of p-phenylenediamine instead of aqueous polyethyleneimine solution for three hours.

As another experiment, the foregoing two membranes were soaked in a 5000 ppm aqueous m-phenylenediamine solution for three hours.

Reverse osmosis performance of aforesaid membranes were measured with 3.5 wt % of aqueous sodium chloride solution and 2.0 wt % of aqueous ethanol solution. Both test results with membrane treatments under pressurerized operation condition and only soaking under atmospheric condition were exhibited in Table 2 as Example 6 and 7, respectively.

TABLE 2

| | | with MEMBRANE A | | with MEMBRANE B | |
|---|---|---|---|---|---|
| | Reverse Osmosis Performance | for NaCl aq. Rej.-Flux (%)-(m$^3$/m$^2$ day) | for Ethanol aq. Rej.-Flux (%)-(m$^3$/m$^2$ day) | for NaCl aq. Rej.-Flux (%)-(m$^3$/m$^2$ day) | for Ethanol aq. Rej.-Flux (%)-(m$^3$/m$^2$ day) |
| | Before Membrane Treatment | 99.7-0.40 | 92-0.47 | 99.4-0.41 | 85-0.44 |
| Example 6 | After Membrane Treatment with p-phenylenediamine under pressurerized condition | 99.9-0.32 | 97-0.33 | 99.5-0.39 | 88-0.42 |
| Example 7 | After Membrane Treatment with m-phenylenediamine under atmospheric condition | 99.9-0.24 | 96-0.25 | 99.5-0.37 | 87-0.40 |

EXAMPLE 8

By using the same membrane elements as employed in Example 2 in the present invention, improving effect of selective separation performance was studied in relation to the concentrations of membrane treatment agent with polyepihalohydrin modified by aminomethylpiperidine as water-soluble amino compounds.

Each reverse osmosis test was conducted with 3.5 wt % of agueous sodium chloride solution under operation conditions of 56 kg/cm$^2$, 25° C., pH 10 l/min. of supplied feed-water flow rate and 13% of water recovery, wherein 1 to 100 ppm of polyepiaminohydrin was dosed into said supplied feed-water and the changes of salt passage ratio in the permeated water were explained in Table 3.

TABLE 3

Salt passage ratio in the permeated water

| Elapsed time (min.) | | 0 | 5 | 15 | 60 |
|---|---|---|---|---|---|
| Concentration of dosed polyepihalohydrin (ppm) modified by aminomethyl-piperidine | 1 | 1.0 | 0.95 | 0.95 | 0.90 |
| | 10 | 1.0 | 0.85 | 0.70 | 0.50 |
| | 100 | 1.0 | 0.70 | 0.50 | 0.50 |

EXAMPLE 9

A sea water desalination plant for 800 m$^3$ day of portable water production by reverse osmosis was constructed by using membrane elements consisted of cross-linked polyfurfuryl alcohls, which was started the operation with such high sea water concentration as 4.5 wt % at the operation conditions of 65 kg/cm$^2$, 25° C., pH 6.5 and such high water recovery as 40%.

Though initial product water quality was 300 ppm which was sufficiently low enough for standard value of 500 ppm settled as drinking water by WHO, it gradually became higher as sea water temperature became higher in proportion to changes of the season (from winter to summer) and besides because of other troubles such as membrane deterioration with oxidative substances as chlorine or oxygen. In summer season, product water quality raised over 450 ppm at 35° C. of sea water temperature. Therefore improving method for selective separation performance, that is to say membrane treatment, was needed.

Very little amount of polyepichlorohydrin modified with ethylenediamine, that is, 150 g of which was dosed into supplied feed-water for only three minutes, concentration of which is 36 ppm, and successively same amount of glyoxal was dosed into supplied feed-water for three minutes at the same operation conditions as usual.

Selective separation performance was immediately improved better than the initial reverse osmosis performance of said plant, that is, product water quality was improved to 250 ppm.

However, when successive 2000 hours' operation was conducted, product water quality had already raised over 450 ppm. Therefore, these same membrane treatments just described above were practised again and the expected results were obtained, that is, product water quality was restored to the initial value.

EXAMPLE 10

One of the aforesaid elements after the membrane treatments using polyepichlorohydrin modified with ethylenediamine and glyoxal in Example 9 was operated with 4.2 wt % of sea water continuously dosed 5 ppm of polyethyleneimine at the operation conditions of 63 kg/cm$^2$, 35° C., pH 6.5 and 13% of water recovery, and in this case, 150 ppm of permeated water quality was maintained even after 2000 hours' operation.

EXAMPLE 11

Same semipermeable membrane elements as manufactured in Example 2 in the present invention were treated successively with 50 ppm of aqueous solution of triethylenetetramine modified polyepihalohydrin and 50 ppm of succinaldehyde in due order. By using said membrane elements, a concentration and recovery process of valuable materials by reverse osmosis was adopted, wherein the main objective material was cupric ulfate. Membrane life was over three months, which proved aforesaid process was sufficiently economical and practical on an industrial scale.

COMPARATIVE EXAMPLE 5

Same membrane elements as manufactured in Example 2 in the present invention was used for aforesaid concentration and recovery process just as same as in Example 11 in the present invention, except that the successive membrane treatments with triethylenetetramine modified polyepihalohydrin and succinaldehyde were omitted. In this case, however, selective separation performance, which was sufficiently good enough for the object at the beginning of operation, could not maintain the critical point for the recovery process of the objective materials within two months, that is, membrane life was less than two months, which meant that aforesaid process using these membrane elements was neither economical nor practical as industrial use.

EXAMPLE 12

A concentration and recovery plant of ε-caprolactam from the industrial waste water by reverse osmosis was constructed by using membrane elements made of semipermeable composite membranes composed of cross-linked polyfurfuryl alcohols, manufactured in accordance with Example 4 in Laid-open Japanese Patent Application Publication No. 11,005/1983 (Tokkai-sho No. 58-11005).

More than 5 wt % of ε-caprolactam was obtained from the process waste containing less than 0.1 wt % of ε-caprolactam concentration by aforesaid process, wherein permeated water from said reverse osmosis plant contained less than 20 ppm of ε-caprolactam at the initial stage. The foregoing plant was continuously operated at such operation conditions as 40 kg/cm$^2$ and 35° C., and when 15,000 hours of operation was passed, permeated water quality had fairly been close to the critical value settled from the viewpoint for water pollution.

Membrane modules were at first cleaned with very dilute aqueous solution of detergents and after foulants was sufficiently cleaned off from the surface of said membranes, two kinds of membrane treatments were carried out as follows; that is, successive membrane treatments with supplied feed-water containing 100 ppm of polyepiaminohydrin and 100 ppm of isophtaldehyde in due order were conducted for one hour and 10 minutes, respectively. And after these membrane treatments were over, permeated water quality was recovered to the initial value.

We claim:

1. A method for improving the selective permeability of a semipermeable membrane, comprising:
   first contracting the membrane with a first water-soluble organic compound in feed water; and
   then contacting the membrane with a second water-soluble organic compound in feed water, said first and second compounds reacting to form a water-insoluble or very slightly water-soluble material.

2. The method as defined in claim 1, wherein the water-insoluble or very slightly water-soluble material formed has a solubility in water of less than 100 ppm.

3. The method as defined in claim 1, wherein the semipermeable membrane comprises cross-linked polyfurfuryl alcohol or polyamide.

4. The method as defined in claim 3, wherein the polyfurfuryl alcohol is a homo-polymer of furfuryl alcohol and/or a co-polymer of furfuryl alcohol and a polyfunctional hydroxy compound and/or polyfunctional glicidyl compound.

5. The method as defined in claim 3, wherein the polyfurfuryl alcohol is made by the thermo-polymerization of furfuryl alcohol and/or mixtures of furfuryl alcohol and polyfunctional hydroxy compounds and/or polyfunctional glycidyl compound in the presence of acid catalyst.

6. The method as defined in claim 3, wherein the polyamide is linear and/or cross-linked polyamides composing of aromatic amides and/or polyetheramide.

7. The method as defined in claim 3, wherein the polyamide is the polycondensation product of an amine-modified-polyepihalohydrin and a polyfunctional acid chloride.

8. The method as defined in claim 3, wherein the polyamide is the polycondensation product of a polyfunctional aromatic amines and a polyfunctional acid chloride.

9. The method as defined in claim 1, wherein the semipermeable membrane comprises polyetherurea.

10. The method as defined in claim 9, wherein the polyetherurea is the polycondensation product of an amine-modified-polyepihalohydrin and a polyfunctional isocyanate.

11. The method as defined in claim 1, wherein the water-soluble compounds are a water-soluble amine and a water-soluble aldehyde.

12. The membrane treatment method as defined in claim 11, wherein the water-soluble amine is selected from the group consisting of triethylenetetrament tetraethylenepentamine, polyepiaminohydrin, polyethyleneimine and polyepihalohydrin modified by ethylenediamine, triethylenetetramino, aminomethylpiperidine, polyethyleneimine and the water-soluble aldehyde is selected from the group consisting of glyoxal, glutaldehyde, succinaldehyde and phthaldehyde.

13. The method as defined in claim 11, wherein the water-soluble amine is a polyfunctional amine and the water-soluble aldehyde is a polyfunctional aldehyde.

14. The method as defined in claim 13, wherein the water-soluble polyfunctional amine is selected from the group consisting of ethylenediamine, trimethylenediamine, hexamethylenediamine, aminoguanidine, phenylenediamine, triaminobenzene, phenylhydrazine, aminodiphenylamine, diaminodiphenylmethane, diaminecyclohexane, aminomethylpiperidine, aminopiperadine, triethylenetetramine, tetraethylenepentamine, polyepiaminohydrin, polyethyleneimine and polyepihalohydrin modified by a polyfunctional amine.

15. The method as defined in claim 14, wherein the water-soluble polyfunctional amine is polyepihalohydrin modified by a polyfunctional amino and is selected from the group consisting of polyfunctional polyepihalohydrin modified by ethylenediamine, triethylenetetramine, aminomethylpiperidine and polyethyleneimine.

16. The method as defined in claim 1, wherein the semipermeable membrane is a composite membrane comprising a microporous substrate and ultrathin film formed thereon.

17. The method as defined in claim 1, wherein the semipermeable membrane is an asymmetric membrane comprising a microporous layer and a skin layer.

18. The method as defined in claim 1, said contacting steps being effected at a pressure from atmospheric pressure up to 100 kg/cm$^2$.

19. The method as defined in claim 18, wherein the pressure is from 3 to 70 kg/cm$^2$.

20. The method as defined in claim 1, wherein the concentrations of the water soluble organic compounds are in the range 0.1 ppm to 1% by weight.

21. The method as defined in claim 20, wherein the concentrations are 1 to 1000 ppm.

* * * * *